No. 820,620. PATENTED MAY 15, 1906.
H. W. BOLENS.
CHAIR IRON.
APPLICATION FILED JUNE 22, 1905.
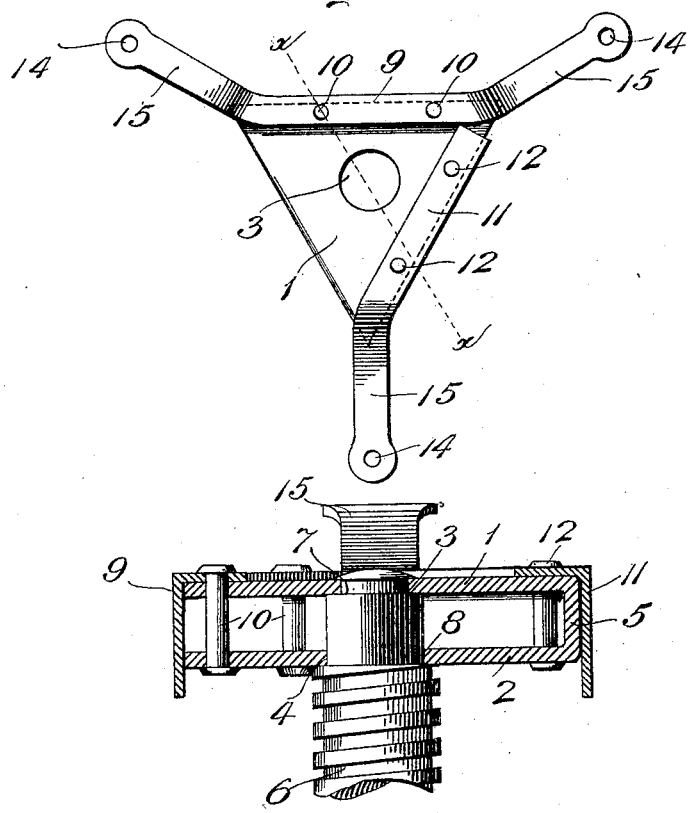
Witnesses:
C. F. Duvall
T. S. Beall
Inventor:
Harry W. Bolens,
by W. J. Duvall
Attorney.

UNITED STATES PATENT OFFICE.

HARRY W. BOLENS, OF PORT WASHINGTON, WISCONSIN.

CHAIR-IRON.

No. 820,620.    Specification of Letters Patent.    Patented May 15, 1906.

Application filed June 22, 1905. Serial No. 266,430.

*To all whom it may concern:*

Be it known that I, HARRY W. BOLENS, a citizen of the United States, residing at Port Washington, in the county of Ozaukee and State of Wisconsin, have invented a Chair-Iron, of which the following is a specification.

This invention relates to improvements in chair-irons, especially those employed in revoluble non-tilting chairs—such, for instance, as stools, &c.

The principal objects are to provide a very simple, cheap, light, and strong chair-iron for the purposes mentioned.

Other, though minor, objects of the invention will hereinafter appear, and the novel features thereof will be particularly pointed out in the claims.

Referring to the drawings, Figure 1 is a top plan view of a chair-iron embodying my invention. Fig. 2 is a sectional view of the same on the line $x\ x$ of Fig. 1.

Similar numerals of reference indicate similar parts in both figures of the drawings.

In carrying out my invention I employ a spreader of any desired angular shape in plan and composed of two plates 1 and 2, having, respectively, alining holes 3 and 4, the latter occurring in the lower plate and being slightly larger than the hole 3 of the upper plate. In the present instance the spreader is shown as triangular; but it is obvious that it may be of any other desired angular shape. The two plates 1 and 2 are in this instance connected at what is the base of the triangle by a vertical web 5, or the two plates may be independent. These plates are conveniently stamped from sheet-steel of suitable gage or thickness, and the shape shown is preferred, among other reasons, for that it will permit of stamping with practically no waste of material; hence the cheapness of manufacture.

The post 6 above its threads is shaped to enter and fit the holes 3 and 4, thus forming upper and lower annular shoulders 7 and 8, respectively, taking under and supporting the plates 1 and 2, above which latter the end of the post is upset.

From the spreader there may extend any desired style or shape of spider-arm; but in order to carry out the objects of this invention I mount a double spider-arm 9 upon one side of the triangular spreader, riveting the same preferably through the two plates, as at 10. A similar arm 11 is mounted on one of the remaining sides of the spreader and secured thereto by rivets 12. These spider-arms are formed of angled steel in order to secure lightness, cheapness, and strength, and the opposite ends of the arm 9 and the outer end of the arm 11 are laterally and upwardly disposed slightly to form attaching ends 13, each provided with a screw-receiving hole 14.

Thus it will be seen that the iron as a whole has in the present instance three attaching ends 15, these ends being in substantially radial alinement with the angles of the spreader. A spreader or chair-iron thus constructed will be found for the use intended to be extremely light and rigid, and hence especially adapted for various styles of stools.

Having thus described my invention, what I claim as new, and desire to secure by Letters Patent, is—

1. A chair-iron, comprising a spreader composed of a plurality of plates arranged vertically one above the other, connections between the plates, and spider-arms extending from the spreader.

2. A chair-iron, comprising a spreader composed of a pair of plates arranged vertically one above the other, connections between the plates, and spider-arms extending from the spreader.

3. A chair-iron, comprising a plurality of triangular plates arranged one above the other and in alinement, means for connecting the plates, and spider-arms mounted upon and projecting from the spreader.

4. A chair-iron, comprising a triangular spreader, a spider-arm disposed along and secured to one side of said spreader and terminating in opposite attaching ends, and a second shorter spider-arm disposed along and secured to an adjacent side of the spreader and having its outer end extending beyond the same and terminating in an attaching end.

5. A chair-iron, comprising a triangular spreader, a spider-arm disposed along and secured to one side thereof and having opposite attaching ends, and a second shorter spider-arm disposed along and secured to an adjacent side of the spreader, the said attaching ends of the two arms being disposed in radial alinement with the angles of the spreader.

6. A chair-iron, comprising a pair of upper and lower plates combining to form a spreader, a spacing means therefor, spider-arms mounted upon and extending from the upper plate, and rivets connecting the spider-arms and plates.

7. A chair-iron comprising upper and lower plates provided with alining holes of different diameters, spider-arms mounted upon the upper plate, and a swivel-post reduced at its upper end to fit said holes.

8. A chair-iron, comprising upper and lower angular plates, each having a central hole, the upper hole being the smaller, the post reduced at its upper end to fit the two holes and producing upper and lower shoulders 7 and 8 to support the plates, angular spider-arms mounted upon the upper plate and terminating beyond the same in attaching ends, and rivets extending through said arms and plates.

9. A chair-iron, comprising upper and lower integrally-formed plates, a post secured centrally therein, and spider-arms secured to and extending from the upper plate.

10. A chair-iron, comprising a triangular spreader, a supporting-post, the double attaching spider-arm 9 secured to one edge of the spreader, and the single attaching spider-arm 11 secured to one of the adjacent edges of the spreader.

11. A chair-iron, comprising the upper and lower integrally-formed plates 1 and 2 and vertical connecting portion 5, the holes 3 and 4 formed in the plates, the swivel having the shoulders 7 and 8 entering the holes and supporting the plates, and the arms 9 and 11 terminating in attaching ends, rivets 10 and 12 passing through the arms and plates.

In testimony whereof I have signed my name to this specification in the presence of two subscribing witnesses.

HARRY W. BOLENS.

Witnesses:
  AUG. BOERGER,
  EDWARD BARELMAN.